(12) United States Patent
Koga

(10) Patent No.: US 6,391,073 B1
(45) Date of Patent: May 21, 2002

(54) AIR CLEANER

(75) Inventor: Hiroaki Koga, Tokyo (JP)

(73) Assignee: Kioritz Corporation, Tokyo (JP)

( * ) Notice: Subject to any disclaimer, the term of this patent is extended or adjusted under 35 U.S.C. 154(b) by 0 days.

(21) Appl. No.: 09/524,674

(22) Filed: Mar. 13, 2000

(30) Foreign Application Priority Data

Mar. 19, 1999 (JP) .......................................... 11-075287

(51) Int. Cl.⁷ .............................................. B01D 46/10
(52) U.S. Cl. ............................ 55/289; 55/283; 55/284; 55/301; 55/304; 55/385.3; 95/277; 95/278; 123/198 E
(58) Field of Search .......................... 55/289, 304, 296, 55/299, 385.3, 283, 284, 301; 123/198 E; 95/277, 278, 284, 287

(56) References Cited

U.S. PATENT DOCUMENTS 3,898,414 A  *  8/1975  Hawley ...................... 55/304
4,217,116 A  *  8/1980  Seever ........................ 55/304
4,246,011 A  *  1/1981  Oberdorfer .................. 55/304
4,661,129 A  *  4/1987  Nederman ................... 55/289
6,217,637 B1 *  4/2001  Toney et al. ................ 95/277

FOREIGN PATENT DOCUMENTS

DE    2749480    *  5/1979  .................. 55/289
JP     593184       1/1984

OTHER PUBLICATIONS

Abstract of Japanese document 59–3184.

* cited by examiner

Primary Examiner—David A. Simmons
Assistant Examiner—Minh-Chau T. Pham
(74) Attorney, Agent, or Firm—Baker Botts L.L.P.

(57) ABSTRACT

An air cleaner includes a cylindrical cleaning filter, and a case rotatably receiving the cleaning filter therein. A dust-removing brush is disposed to contact with a filter portion of the cleaning filter, and a manipulating device coupled to the cleaning filter and accessible from outside the case enables the cleaning filter to be rotated from outside of the case.

4 Claims, 4 Drawing Sheets

AIR CLEANER

BACKGROUND OF THE INVENTION

The present invention relates to an air cleaner which is suited for use in an air-intake system of a small air-cooled internal combustion engine that is adapted to be mounted on a portable power working machine such as a chain saw, a bush cutter, a power blower, etc.

An air cleaner of the type referred to above and known in the prior art is shown in FIG. 4. The air cleaner 60 shown in FIG. 4 is designed to be employed in an air-intake system of a small air-cooled two-cycle gasoline engine to be mounted on a chain saw and is provided with a cleaning filter 61 comprising a bellows-type filter element 62 made from an air-permeable filter paper which is formed into bellows so as to enlarge the filtering area thereof and shaped into a cylindrical body, a reinforcing inner cylinder 66 made from a punched metal sheet having a plurality of through-holes 66a, which is arranged on the inner side of the filter element 62 so as to retain the cylindrical configuration of the filter element 62, and a pair of annular caps 69 having a U-shaped cross-section, which are attached to the top and bottom ends of the filter element 62 and the inner cylinder 66.

The cleaning filter 61 is mounted, through its bottom (the cap 69 which is disposed on the bottom side of the cleaning filter 61), on a mount 82 attached to the upper end of a connecting pipe 80, which is connected with a diaphragm-type carburetor 90. To the mount 82 is attached a cap-fixing bolt 77 in such a manner that the cap-fixing bolt 77 extends upwardly from the bottom of the mount 82 so as to be disposed at the axis of the cleaning filter 61. The cap-fixing bolt 77 receives a screw 74, which is embedded in and fixed to a central boss 72 of a sealing cap 70 having a cup-like shape and which is designed to be rotationally attached to the cap-fixing bolt 77 so as to seal an upper opening within the cap 69 on an upper side of the cleaning filter 61. With the above-described construction, the cleaning filter 61 is clamped between the mount 82 and the sealing cap 70, thereby forming a seal between the interior and the exterior of the cleaning filter 61.

With the air cleaner 60 constructed in the manner described above, since the upper opening of the cleaning filter 61 is closed by the sealing cap 70, the external air is allowed to enter into the air cleaner 60 only through the filter element 62 that forms the outer circumference of the cleaning filter 61. As a result, dust entrained in the external air is removed when the external air passes through the filter element 62, and the cleaned air is introduced into the carburetor 90 through the connecting pipe 80 and then mixed with fuel, the resultant air-fuel mixture being introduced into an intake port of the engine (not shown).

In the operation of a portable power working machine such as a chain saw, a bush cutter, a power blower, etc., dust such as sawdust, powder of cut material and sand-like dust are inevitably generated. When dust of those kinds is allowed to enter together with air into the air intake system of the internal combustion engine, and to collect on the filter member (the filter element 62) of the air cleaner 60, clogging of the filter is caused, thus giving rise to an irregularity of the engine as well as a deterioration in the performance of the engine due to an insufficiency in the flow rate of intake air. Accordingly, it is required in the operation of the portable power working machine to frequently clean the air cleaner 60. However, it is required in the cleaning of the air cleaner 60 of the prior art to dismount or disassemble a machine body cover (not shown), the sealing cap 70, etc., with the use of tools, a task that is quite troublesome for the operator.

BRIEF SUMMARY OF THE INVENTION

The present invention has been made to solve the aforementioned problems. In particular, it is an object of the present invention to provide an air cleaner which makes it possible to easily clean the filter member and is capable of preventing the air cleaner from being clogged with dust.

With a view to attaining the aforementioned object, there is provided, according to the present invention, an air cleaner that includes a cylindrical cleaning filter and a case rotatably receiving the cleaning filter therein. A dust-removing brush is arranged to contact with a filter portion of the cleaning filter, and a device is coupled to the cleaning filter so that the cleaning filter is rotatable from the outside of the case.

In a preferred embodiment of the air cleaner, a manipulating member having a knob is assembled with the cleaning filter, thereby enabling the manipulating member to be rotated together with the cleaning filter, the knob being protruded out of the case.

In another desirable embodiment of the air cleaner, a portion of the case is arranged so that it can be opened or closed so as to make it possible to allow a dust removed from the filter portion by the dust-removing brush and collected in the case to be discharged from the case.

In the aforementioned embodiments of the air cleaner constructed according to the present invention, when the knob that protrudes out of the case is rotated, the cleaning filter is caused to be rotated concurrently with the rotation of the knob. As a result, the dust adhered onto the filter portion is scraped away from the filter portion by the dust-removing brush which is kept in contact with the filter portion. The dust thus removed and collected in the case is then discharged out of the case by opening the aforementioned portion of the case.

The task of cleaning the air cleaner embodying the present invention can be quite easily accomplished by simply rotating the knob. Although it may be impossible to completely remove the dust as in the case when the customary form of cleaning using compressed air, etc. is employed, severe clogging of the cleaning filter that may adversely effect the performance of the engine can be eliminated by cleaning with the dust-removing brush.

Accordingly, it becomes possible, with the air cleaner according to the present invention, to simplify the cleaning task while always assuring some degree of clean level. Therefore, the frequency of the standard cleaning necessitating the removal of the cleaning filter from the case can be remarkably reduced as compared with air cleaners of the prior art, thus obviating the re-adjustment of the carburetor, etc.

For a better understanding of the present invention and of further advantages thereof, reference maybe made to the following description of an exemplary embodiment, taken in conjunction with the accompanying drawings.

DESCRIPTION OF THE EMBODIMENT

The present invention will be further explained with reference to the drawings depicting one embodiment according to the present invention.

Figure 1:
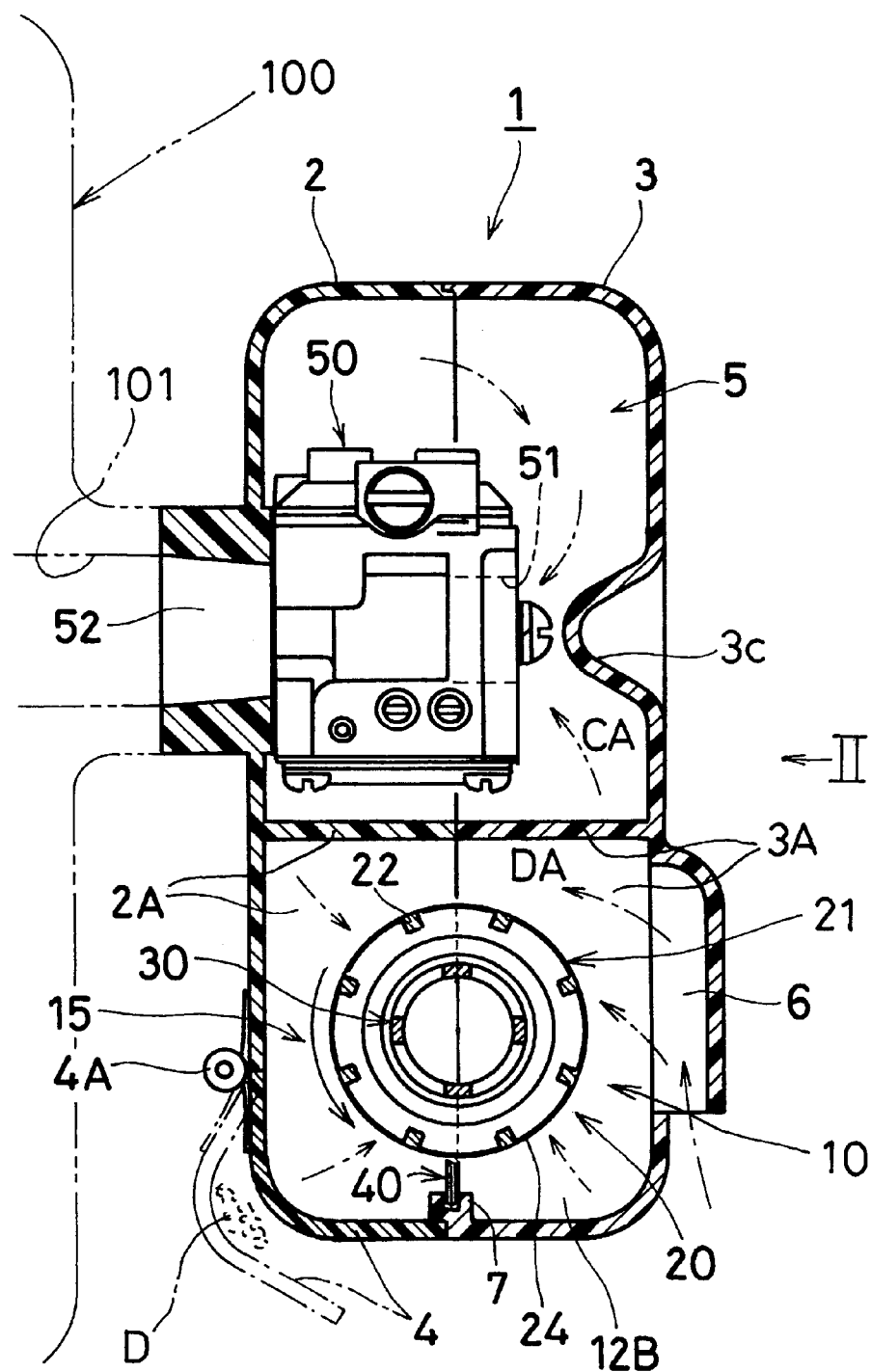
FIG. 1 is a cross-sectional view showing a carburetor unit employing an air cleaner representing one embodiment of the present invention.

FIG. 1 shows a carburetor unit 1 employing one embodiment of an air cleaner according to the present invention. The carburetor unit 1 includes a case having a base 2 and a cover 3 attached to the base 2. A diaphragm-type carburetor 50 and an air cleaner 10 are received in the case.

Figure 3:
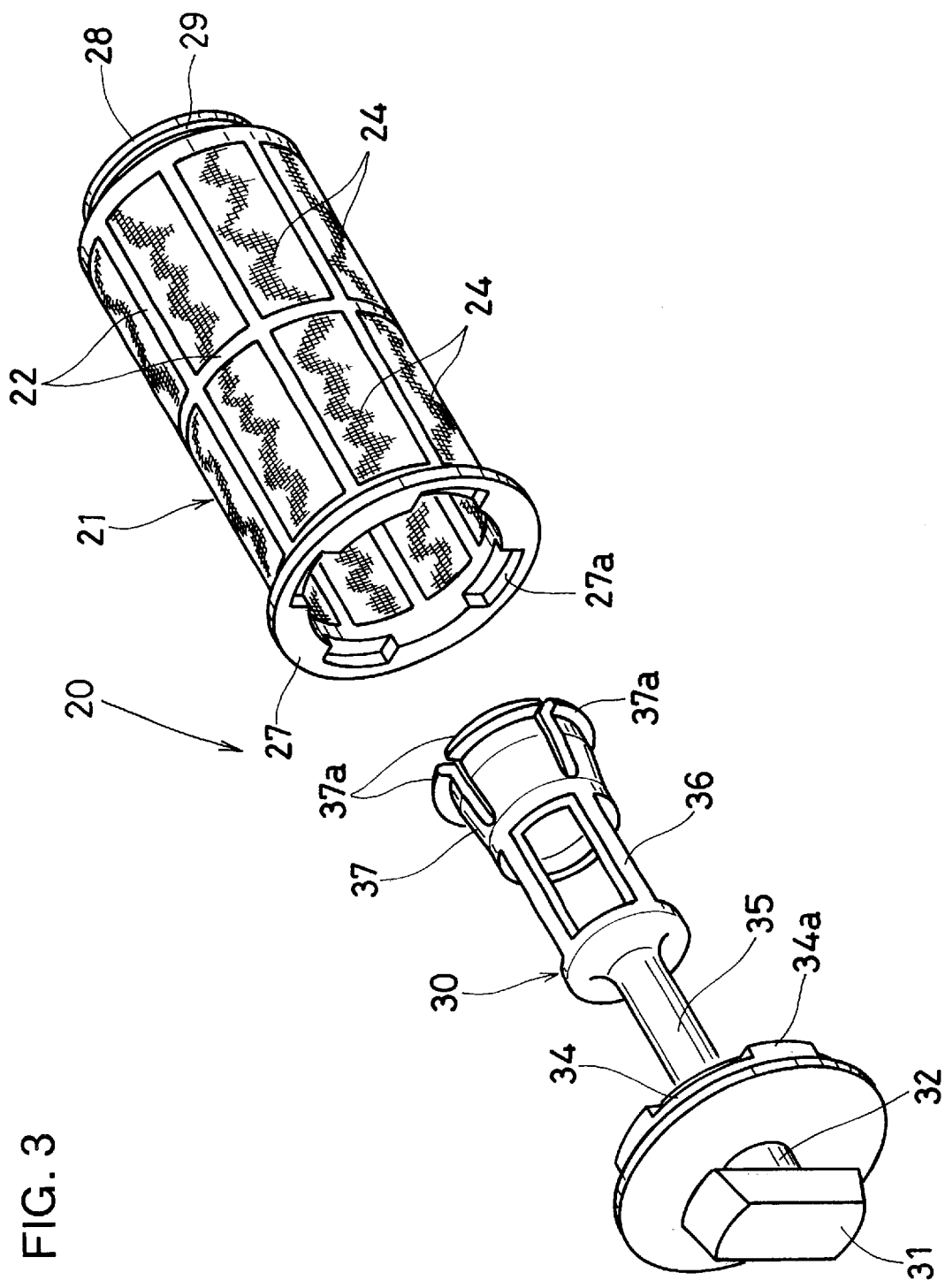
FIG. 3 is an exploded perspective view showing the cleaning filter and the manipulating member of the air cleaner shown in FIG. 2.
Figure 4:
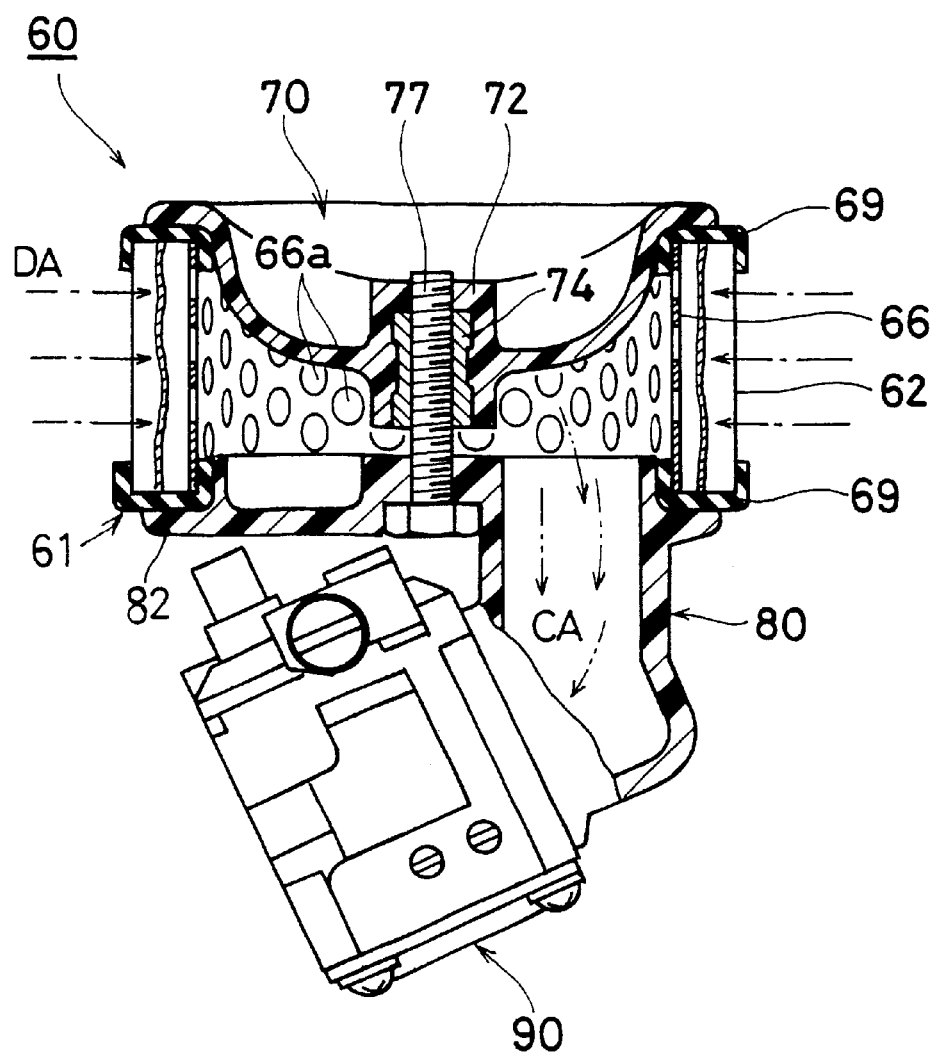
FIG. 4 is a partially sectioned longitudinal view illustrating, together with a carburetor, one example of an air cleaner according to the prior art.

As shown in FIG. 3, the air cleaner 10 comprises a cleaning filter 20 consisting of a cylindrical filter portion 21, a first annular end portion 27 continuously attached to one end of the cylindrical filter portion 21 and a second annular end portion 28 continuously attached to the other end of the cylindrical filter portion 21, and a manipulating member 30 provided with a knob 31 and received within the cleaning filter 20 in a manner such that the cleaning filter 20 is rotatable with the manipulating member 30 and is axially fixed to the manipulating member 30.

The cylindrical filter portion 21 of the cleaning filter 20 is formed of an air permeable plastic mesh element 24 which is secured to a lattice-like ribbed cylindrical body 22. The cleaning filter 20 can be manufactured by means of injection molding wherein the plastic mesh element 24 is employed as an insert and the ribbed cylindrical body 22 is molded to the mesh element 24.

As clearly shown in FIG. 2 in addition to FIG. 3, the manipulating member 30 is constituted successively, starting at one end thereof, by the knob 31, which is disposed outside of the case (formed by the base 2 and cover 3), by a short neck portion 32, which is rotatably supported by first bearing portions 2a and 3a that are described below, by a cap member 34, which is provided with a plurality of engaging projections 34a that are configured to be received in a plurality of engaging recesses 27a formed in the first annular end portion 27 of the cleaning filter 20, by a rod portion 35 that is received in the cleaning filter 20, by a cage-like cylindrical portion 36, and by a slit skirt portion 37, which is elastically shrinkable. The skirt portion 37 is provided, at the end thereof, with a plurality of disengagement-preventing ribs 37a, which are adapted to be engaged with the end face of the second annular end portion 28 of the cleaning filter 20.

Figure 2:
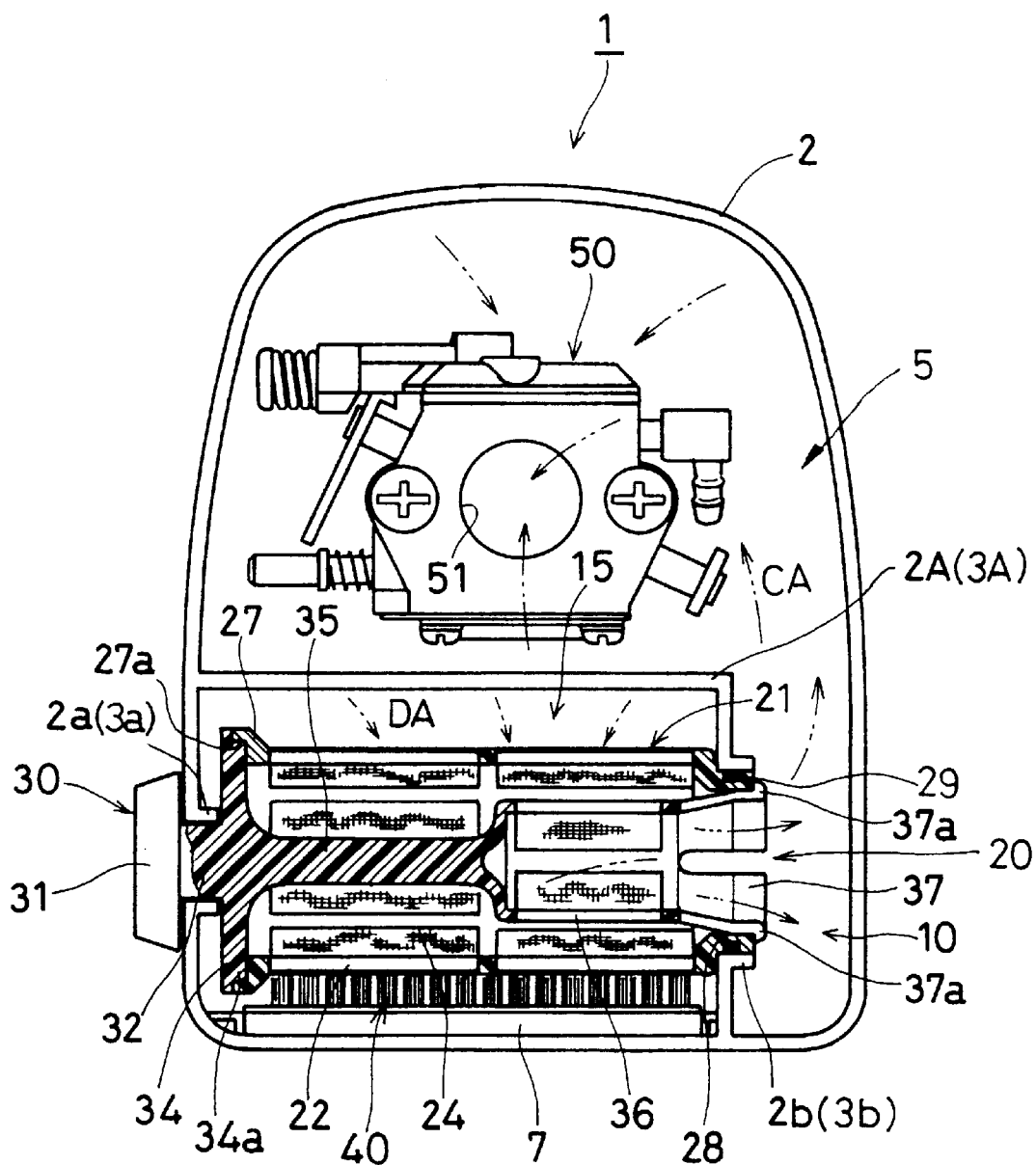
FIG. 2 is a partially sectioned cross-sectional view of the embodiment taken along the line indicated by the arrow II in FIG. 1, showing the cover removed.

As seen in FIGS. 1 and 2, the base 2 and cover 3 are provided, respectively, with the first bearing portions 2a and 3a for rotatably supporting the entire circumference of the short neck portion 32 of the manipulating member 30, and with second bearing portions 2b and 3b for rotatably supporting the entire circumference of the second annular end portion 28 of the cleaning filter 20. The base 2 and cover 3 are provided, respectively, with partitioning walls 2A and 3A formed integrally with the second bearing portions 2b and 3b, respectively, and defining an unfiltered air passage space 15 for introducing the external unfiltered air toward the filter portion 21, so that cleaned air that has been cleaned by the filter portion 21 as it passes therethrough from the unfiltered air passage space 15 can be delivered from the second annular end portion 28 to a cleaned air passage space 5 formed outside the partitioning walls 2A and 3A and surrounding the carburetor 50 received inside the case.

The cleaning filter 20 is cylindrical as a whole. The base 2 and cover 3, the first bearing portions 2a and 3a, the second bearing portions 2b and 3b, and the partitioning walls 2A and 3A are respectively formed of two parts which are divided along a diametrical plane of the cleaning filter 20 and are hence configured to constitute a circular supporting space, respectively, when they are joined to each other.

Further, for the purpose of ensuring an excellent sealing property between the second annular end portion 28 of the cleaning filter 20 and the second bearing portions 2b and 3b, an 0-ring 29 is attached to the outer circumference of the second annular end portion 28.

In the embodiment, a dust-removing brush 40 is attached to a mounting member 7 formed on an edge of the cover 3 so as to enable the dust-removing brush 40 to be contacted with the full length of the filter portion 21 of the cleaning filter 20.

Additionally, a lower corner portion 4 of the base 2 is arranged to be opened or closed by way of a hinge member 4A, thereby allowing a dust D removed from the filter portion 21 by the dust-removing brush 40 and collected in the case to be discharged therefrom (see FIG. 1).

With the air cleaner 10 constructed as described above, air DA containing the dust D is allowed to enter from an air intake port 6 formed in the cover 3 and is then introduced via the unfiltered air passage space 15 toward the filter portion 21 of the cleaning filter 20. The air DA thus introduced is then sucked through the filter portion 21 into the interior of the cleaning filter 20, thereby enabling the dust D to be removed and thus cleaning the air by the effect of the filter portion 21. The cleaned air CA sucked in the cleaning filter 20 is transferred, as shown by a phantom arrow in FIGS. 1 and 2, from the second annular end portion 28 of the cleaning filter 20 to the cleaned air passage space 5 formed outside the partitioning walls 2A and 3A, and then, while being guided by an air guiding cone portion 3C of the cover 3, sucked smoothly into an inlet port 51 of the carburetor 50 so as to be mixed with fuel, the resultant air-fuel mixture being delivered from a delivery port 52 to an intake port 101 of an internal combustion engine 100.

The air cleaner 10 according to the embodiment is featured in that when the knob 31 that protrudes out of the case is turned counterclockwise in FIG. 1 (it would be preferable to provide any suitable backstop mechanism in the case), the cleaning filter 20 is also caused to co-rotate with the knob 31. As a result, the dust D adhered onto the filter portion 21 is scraped away from the filter portion 21 by the dust-removing brush 40, which is kept in contact with the filter portion 21. The dust D thus removed and collected in the base 2 and cover 3 is then periodically discharged from the case by opening the lower corner portion 4 of the base 2.

As explained above, with the air cleaner 10 of the present invention, the task of cleaning the air cleaner 10 can be quite easily accomplished by simply rotating the knob 31. Although it may be impossible to completely remove the dust as in the case of the standard cleaning process in which compressed air, etc. is employed, a critical clogging of the cleaning filter 20 that may degrade the performance of the engine 100 can be eliminated by cleaning with the dust-removing brush 40.

Accordingly, it becomes possible, with the air cleaner 10 according to the present invention, to simplify the task of cleaning the cleaning filter 20 while always assuring some degree of clean level. Therefore, the frequency of the standard cleaning necessitating the removal of the cleaning filter 20 from the case can be remarkably reduced as compared with the air cleaner 60 of the prior art, thus obviating the re-adjustment of the carburetor 50, etc.

Further, with the air cleaner 10 of the present invention, since the cleaning filter 20 is supported by the clamping of the top and bottom ends thereof by making use of the first bearing portions 2a and 3a, and the second bearing portions 2b and 3b, only the top and bottom end portions of the cleaning filter 20 (the first annular end portion 27 and the second annular end portion 28) are required to be reinforced. Therefore, it is no more required to employ the conventional filter element-reinforcing inner cylinder 66, thus making it possible to reduce manufacturing costs and to reduce the entire weight of the air cleaner.

Additionally, since the sealing portions of the air cleaner 10 are constituted by surfaces that are engaged in a radial direction rather than an axial direction (see FIG. 2, the second annular end portion 28), an excellent sealing can be easily and rationally ensured. Moreover, since the base 2 and cover 3, the first bearing portions 2a and 3a, the second bearing portions 2b and 3b, and the partitioning walls 2A and 3A are respectively formed of two parts which are divided along the radial direction of the cleaning filter 20, the assembling as well as the maintenance of these members can be facilitated.

While the foregoing embodiment of the present invention has been explained in detail for the purpose of illustration, it will be understood that the construction of the air cleaner can be varied without departing from the spirit and scope of the invention.

For example, instead of allowing the dust to be accumulated within the case as in the case of the above embodiment, the dust that has been removed by making use of the dust-removing brush 40 may be continuously discharged out of the case by taking advantage of the negative pressure of a cooling fan of the internal combustion engine.

As clearly seen from the above embodiment, it is now possible with the air cleaner of the present invention to easily clean the filter member and to prevent the air cleaner from being clogged with dust.

What is claimed is:

1. An air cleaner comprising an annular cleaning filter;

a case rotatably receiving the cleaning filter therein;

a dust-removing brush disposed to contact with a filter portion of the cleaning filter; and a device coupled to the cleaning filter and accessible from outside the case that enables the cleaning filter to be rotated relative to the brush from outside of the case to cause dust to be removed from the cleaning filter and collected in the case.

2. The air cleaner according to claim 1, wherein the device includes a manipulating member having a knob assembled with the cleaning filter, thereby enabling the manipulating member to be co-rotated with the cleaning filter, and wherein the knob protrudes out of the case.

3. The air cleaner according to claim 1, wherein a portion of the case is arranged to be opened and closed so as to make it possible to allow dust removed from the filter portion by the dust-removing brush and collected in the case to be discharged out of the case.

4. The air cleaner according to claim 2, wherein a portion of the case is arranged to be opened and closed so as to make it possible to allow dust removed from the filter portion by the dust-removing brush and collected in the case to be discharged out of the case.

* * * * *